US012637822B2

(12) United States Patent
Michaud

(10) Patent No.: US 12,637,822 B2
(45) Date of Patent: May 26, 2026

(54) SLUICE GATE FOR A HYDROPOWER STATION

(71) Applicant: ANDRITZ HYDRO GmbH, Vienna (AT)

(72) Inventor: Francis Michaud, Sainte-Catherine (CA)

(73) Assignee: ANDRITZ HYDRO GmbH, Vienna (AT)

( * ) Notice: Subject to any disclaimer, the term of this patent is extended or adjusted under 35 U.S.C. 154(b) by 361 days.

(21) Appl. No.: 18/128,785

(22) Filed: Mar. 30, 2023

(65) Prior Publication Data

US 2023/0383490 A1 Nov. 30, 2023

(30) Foreign Application Priority Data

May 31, 2022 (AT) .............................. A 50383/2022

(51) Int. Cl.

*E02B 9/02* (2006.01)
*F03B 11/00* (2006.01)
*F03B 13/08* (2006.01)

(52) U.S. Cl.

CPC .............. *E02B 9/027* (2013.01); *F03B 11/00* (2013.01); *F03B 13/08* (2013.01)

(58) Field of Classification Search

CPC ..... E02B 7/30; E02B 7/26; E02B 7/28; E02B 9/027
USPC .......................................... 405/103, 104, 105
See application file for complete search history.

(56) References Cited

U.S. PATENT DOCUMENTS

| | | | | |
|---|---|---|---|---|
| 2,040,239 A * | 5/1936 | Bray | C10G 21/003 208/309 |
| 4,417,537 A | 11/1983 | Di Tella et al. | |
| 4,934,868 A * | 6/1990 | Hellstrom | E02B 7/34 405/103 |
| 5,067,454 A * | 11/1991 | Waddington | F16N 29/02 700/282 |

FOREIGN PATENT DOCUMENTS

| | | |
|---|---|---|
| CN | 208995995 | 6/2019 |
| CN | 209619955 | 11/2019 |

(Continued)

OTHER PUBLICATIONS

Austria Search Report/Office Action conducted in counterpart Austria Appln. No. A50383/2022, dated Sep. 15, 2022, along with an English translation thereof.

(Continued)

*Primary Examiner* — Sean D Andrish
(74) *Attorney, Agent, or Firm* — GREENBLUM & BERNSTEIN, P.L.C.

(57) ABSTRACT

A sluice gate for a hydropower station, a method of operating a sluice gate and a hydropower station. The sluice gate includes rollers via which the sluice gate can be movably mounted on rails and a sealing surface having a seal with which an upstream water can be sealed off from a downstream water. Lubricant lines are provided through which lubricant can be fed to the rollers and lubricant return lines are connected to the rollers. Via the lubricant return lines, used lubricant can be guided from the rollers to one or more collection locations in order to be able to collect and properly dispose of used lubricant.

13 Claims, 4 Drawing Sheets

(56) References Cited

FOREIGN PATENT DOCUMENTS

| | | | |
|---|---|---|---|
| CN | 209636746 | | 11/2019 |
| CN | 210917249 | * | 7/2020 |
| CN | 211498759 | | 9/2020 |
| DE | 3030160 | | 3/1981 |
| GB | 191211445 | * | 9/1912 |
| JP | S52-47673 | | 4/1977 |
| WO | 2014/037193 | | 3/2014 |
| WO | 2015/067653 | | 5/2015 |
| WO | 2016/046030 | | 3/2016 |

OTHER PUBLICATIONS

Hadhuey et al., “Schmierverfahrent” (Wikipedia), [online] [retrieved Sep. 15, 2022], URL https://de.wikipedia.org/wiki/Schmierverfahren, May 18, 2022, along wiht an English translation thereof.

* cited by examiner

SLUICE GATE FOR A HYDROPOWER STATION

CROSS-REFERENCE TO RELATED APPLICATIONS

This application claims priority under 35 U.S.C. § 119 (a) to Austria Application No. A 50383/2022 filed May 31, 2022, the disclosure of which is expressly incorporated by reference herein in its entirety.

BACKGROUND OF THE INVENTION

The invention relates to a sluice gate for a hydropower station having rollers via which the sluice gate can be movably mounted on rails and a sealing surface having a seal with which an upstream water can be sealed off from a downstream water, wherein lubricant lines are provided through which lubricant can be fed to the rollers.

The invention furthermore relates to a method for operating a sluice gate of a hydropower station, wherein the sluice gate is moved using rollers mounted on one or more rails in order to seal off an upstream water from a downstream water or to produce a connection between the upstream water and downstream water, wherein lubricant is fed to the rollers through lubricant lines.

Sluice gates of the type named at the outset, which are also referred to as roller sluice gates due to the mounting via rollers, have become known from the prior art, in particular for dams, locks, and the like, with which sluice gates an upstream water can be variably sealed off from a downstream water and, by moving the sluice gate along the rails, a height difference between the upstream water and downstream water can be influenced.

The rollers are typically rotatably mounted via roller bearings, which roller bearings are lubricated. For this purpose, lubricant lines are normally provided through which lubricant can be fed to the individual rollers or the bearings of the rollers.

It has been shown, however, that sluice gates of this type are detrimental for an environment and a health of living organisms in a surrounding area of the sluice gates.

BRIEF SUMMARY OF THE INVENTION

It is therefore the object of the invention to specify a sluice gate of the type named at the outset which produces a lower environmental and health impact during operation.

According to the invention, this object is attained by a sluice gate of the type named at the outset in which lubricant return lines connected to the rollers are provided, via which lubricant return lines used lubricant can be guided from the rollers to one or more collection locations in order to be able to collect and properly dispose of used lubricant.

In the course of the invention, it was recognized that a reason for the harmful environmental and health effects of sluice gates from the prior art is accounted for by the fact that used lubricant leaks out of the rollers, or out of the bearings of the rollers, into a surrounding area in an unimpeded manner and thereby contaminates the body of water adjacent to the sluice gate, whereby harmful health effects of the lubricant for living organisms of the body of water subsequently emerge. By a targeted removal of the lubricant from the rollers through lubricant return lines and subsequent disposal, this contamination of the surrounding area can thus be easily avoided. For this purpose, the lubricant return lines open into one or more collection locations, from which the used lubricant can easily be removed and disposed of as part of a routine maintenance, for example.

The used lubricant can, in principal, be guided to a central collection location from the individual rollers using separate individual lines. Furthermore, it can also be provided that multiple collection locations are provided which are connected to different rollers via individual lubricant return lines.

Typically, rollers of a corresponding sluice gate are arranged along multiple rows, wherein one row is respectively assigned to a rail on which the rollers can be moved. In this respect, it has proven effective that all rollers that are assigned to a rail are connected to a collection location via separate or shared lubricant return lines. As a result, one collection location each can, for example, be provided per rail along which the sluice gate can be moved.

It is particularly beneficial if the rollers are arranged in multiple rows and lubricant return lines of multiple rollers, in particular rollers of a row, are connected to a shared lubricant return collection line. In a particularly simple embodiment, the sluice gate can thus for example be embodied such that all lubricant return lines of the rollers of a row open into one lubricant return collection line, which simultaneously forms the collection location for the used lubricant from the rollers of said row. From this collection location, the used lubricant can then easily be removed, in particular using a mobile pump or the like.

The lubricant return collection line can, for example, be embodied as a tube closed at one end, into which tube the lubricant return lines open.

It has proven effective that the lubricant return collection line is roughly vertically oriented. In this manner, gravity alone effects on the one hand a simple collection of used lubricant at the base of the lubricant return collection line, which is typically closed at a lower end. On the other hand, used lubricant can then also easily be removed from the lubricant return collection line, for example either by opening a valve at a lower end in order to drain collected used lubricant or by inserting a pump into the vertical lubricant return collection line from an upper end, with which pump used or contaminated lubricant can be pumped out of the lubricant return collection line.

It has proven beneficial that the lubricant return collection line has a diameter that is equal to at least five times a diameter of the lubricant return lines. As a result, a low pressure loss in the lubricant return collection line can easily be achieved, and it can be ensured that used lubricant can be easily moved through the lubricant return lines and the lubricant return collection line. Diameter ratios of this type have proven effective for ensuring a low line resistance and a low pressure loss over the lubricant return collection line.

It is particularly beneficial if the lubricant return lines connect locations on the rollers to locations on the lubricant return collection line that are essentially arranged in the same horizontal position. In this manner, in particular with a vertical lubricant return collection line, a comparatively short line length of the lubricant return lines that connect the bearings to the lubricant return collection line is ensured, whereby a low pressure loss in the lubricant return lines is ensured. Typically, the locations at which the lubricant return lines open into the lubricant return collection line lie slightly below the locations at which the lubricant return lines are connected to the bearings, for example at bearing covers or roller axles. As a result, a slight slope is achieved between the bearings and the lubricant return collection line, whereby a draining of used lubricant is facilitated by gravity.

It shall be understood that statements in this application such as below, above, horizontal, and the like, refer to an intended working state of the sluice gate, in which working state the sluice gate is normally moved on vertical rails.

It is preferably provided that multiple lubricant lines are arranged, at least in regions, in a channel together with the lubricant return collection line, which channel comprises at an upper end closable openings through which fresh lubricant can be fed and used lubricant can be removed. In this manner, the sluice gate can easily be serviced from above, wherein both a feed of fresh lubricant and a removal of used lubricant that has collected in the lubricant return collection line(s) can easily occur. The channel therefore typically protrudes past the sealing surface at an upper end.

Preferably, the channel comprises at an upper end a fitting via which fresh lubricant can be fed to each individual bearing of the corresponding row via separate lubricant lines. Thus, for example, on a fitting of a sluice gate that respectively comprises eight rollers for one rail each arranged in two rows, eight lubricant feed openings are positioned which are connected to the individual eight rollers or eight bearings via eight lubricant lines, so that the bearings of the rollers can be lubricated independently of one another. Furthermore, the fitting preferably comprises a removal opening that is connected to a lubricant return collection line, wherein used lubricant collected in the lubricant return collection line can, for example, be removed by means of a mobile pump which is inserted or lowered into the removal opening.

It is beneficial if the channel vertically protrudes past the sealing surface at an upper end. This enables a simple accessibility to the lubricant lines and the lubricant return collection line so that a maintenance is easily possible.

Preferably, the rollers of a sluice gate are arranged in two vertical rows, in relation to a working position of the sluice gate, so that two lubricant return collection lines are provided which are typically likewise vertically oriented and, at an upper end, are guided in two channels spaced apart from one another, through which channels a maintenance can occur, wherein the channels typically respectively comprise at an upper end fittings with connections or closable openings for the lubricant lines and the lubricant return collection line.

It is beneficial if one or more protective plates are provided which are arranged roughly parallel to the sealing surface and between which protective plates and the sealing surface the lubricant lines, the lubricant return lines, and/or the lubricant return collection line are arranged, at least in regions. As a result of these protective plates, in particular a damaging of the lubricant lines, the lubricant return lines, and/or the lubricant return collection lines can easily be avoided.

In a hydropower station, in particular a dam, with a sluice gate that can be moved on rails, through which sluice gate an upstream water can be separated from a downstream water, it is particularly beneficial if the sluice gate is embodied according to the invention. In this manner, a particularly environmentally friendly sluice gate is achieved which can at the same time be easily moved as a result of a continuous lubrication of the rollers.

It is beneficial if a mobile pump is provided with which used lubricant can be pumped away out of the lubricant return collection line(s). For this purpose, the pump normally comprises a line which can be introduced into the lubricant return collection lines in order to be able to remove lubricant collected at the base and dispose of it.

The other object is attained according to the invention by a method of the type named at the outset in which used lubricant is moved from the rollers to one or more collection locations through lubricant return lines. Preferably, a sluice gate embodied according to the invention is used.

It is beneficial if the used lubricant is pumped away from one or more collection locations located below the rollers, in particular from a lubricant return collection line connected to multiple lubricant return lines, using a pump, in particular a mobile pump.

Alternatively or additionally, a pump permanently attached to the lubricant return collection line can, of course, also be provided.

Used lubricant or grease can clump up and clog lines. In order to be able to also reliably remove used lubricant of this type, it can be provided that the used lubricant is liquefied before being conveyed to the collection location(s), in particular by adding chemicals.

Additional features, advantages, and effects of the invention follow from the exemplary embodiment described below. In the drawings which are thereby referenced:

DETAILED DESCRIPTION OF THE INVENTION

Figure 1:
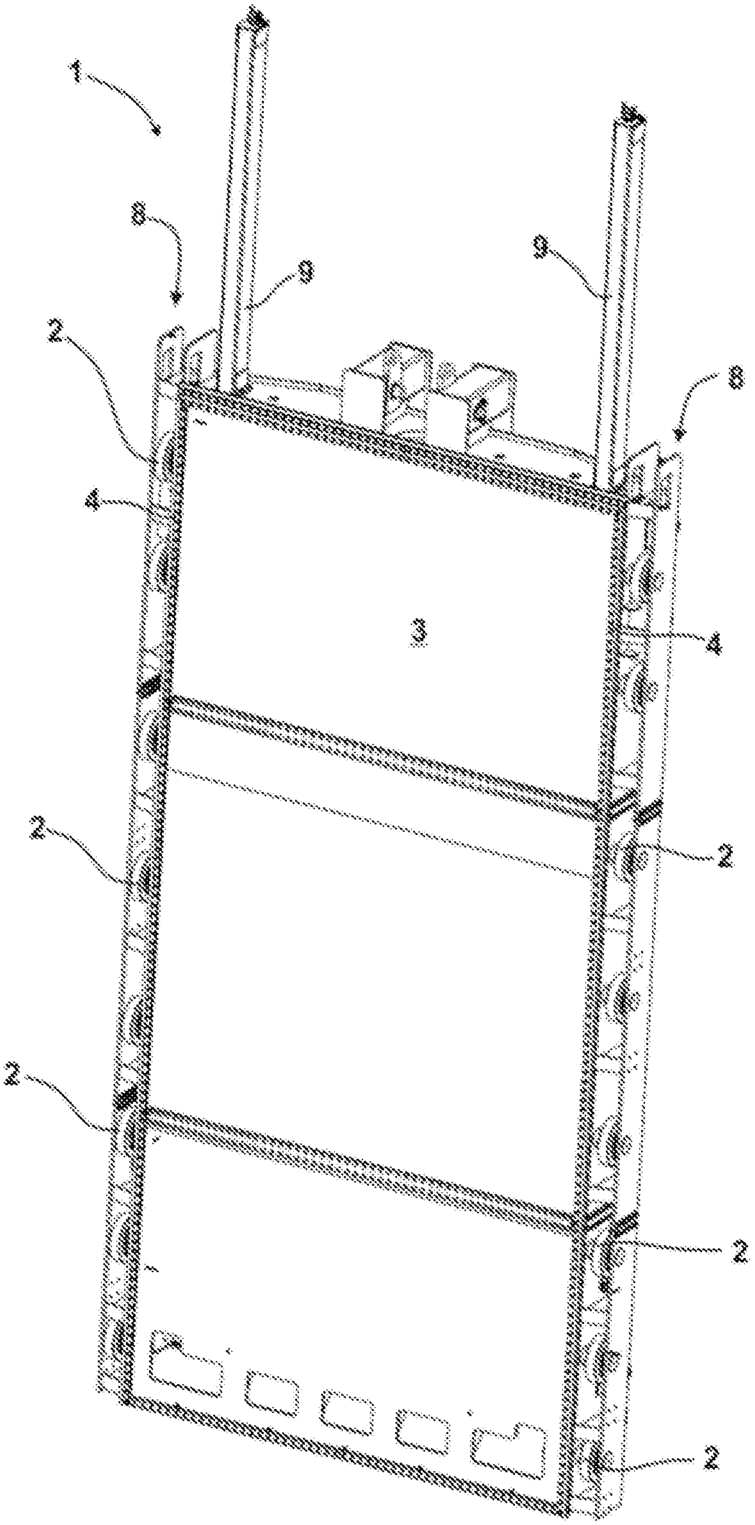
FIGS. 1 and 2 show a sluice gate according to the invention in different views.
Figure 2:
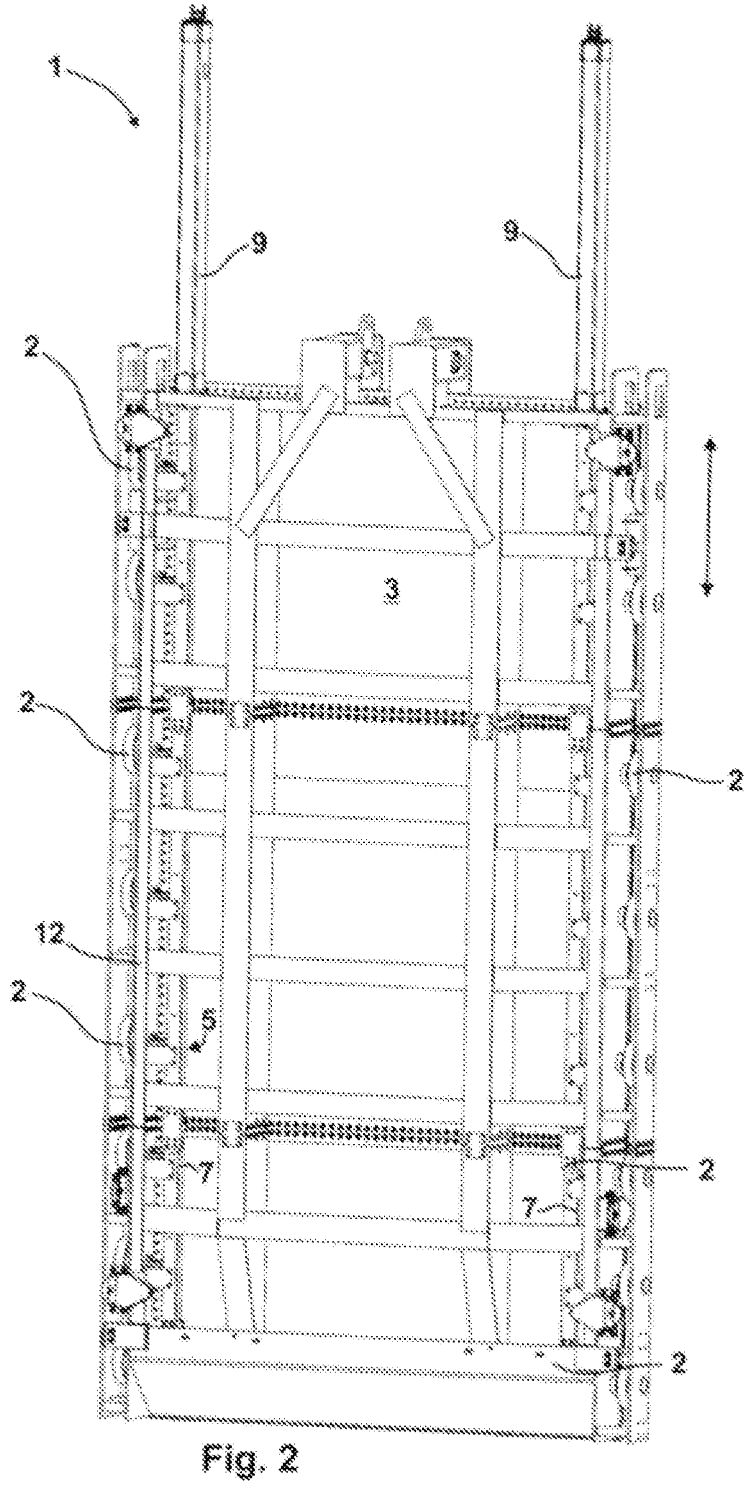

FIG. 1 and FIG. 2 show a sluice gate 1 according to the invention in different views. The sluice gate 1 comprises a sealing surface 3 with a peripheral seal 4 visible in FIG. 1, by means of which an upstream water can be hydraulically separated from a downstream water. FIG. 2 shows the rear side of the sluice gate 1, wherein reinforcing ribs that mechanically stabilize the sealing surface 3 are also visible. Furthermore, the sluice gate 1 in FIG. 1 and FIG. 2 comprises visible, rotatable rollers 2, by means of which the sluice gate 1 can be movably mounted on two rails, not shown, in order to be able to alter a water level of the upstream water relative to the downstream water, in that the sluice gate 1 is moved along the rails, as a rule vertically.

In order to be able to lubricate the rollers 2 or the bearings of the rollers 2, lubricant lines 5 are provided which respectively reach from channels 9 protruding past the sealing surface 3 at an upper end to the individual rollers 2 or bearings. Each individual bearing or each individual roller 2 can thus be separately supplied with lubricant.

Furthermore, lubricant return lines 6 connected to the individual rollers 2 or bearings are provided, which lubricant return lines 6 likewise open into the channels 9 at the head end. However, the lubricant return lines 6 do not directly open into the channels 9, but rather initially into a vertical lubricant return collection line 7, from which the used lubricant from all rollers 2 of a row 8 can be disposed of in a collected manner, for example using a mobile pump. For this purpose, one lubricant return collection line 7 is provided per row 8, in which lubricant collection line 7 used lubricant from the rollers 2 of a row 8 is collected. A leakage of used lubricant into a surrounding area is thus avoided, and an environmental pollution is easily prevented.

As can be seen, the lubricant lines 5 and the lubricant return collection line 7 are vertically oriented, so that used lubricant collected in the lubricant return collection line 7 can be easily removed from said lubricant return collection line 7, for example using a pump.

Furthermore, it can be seen from FIGS. 1 and 2 that the lubricant lines 5, the lubricant return lines 6, and the lubricant return collection lines 7 are covered by protective plates 12 that are roughly parallel to the sealing surface 3 so that the lubricant lines 5, the lubricant return lines 6, and the lubricant return collection lines 7 are positioned between the sealing surface 3 and the protective plates 12.

Figure 3:
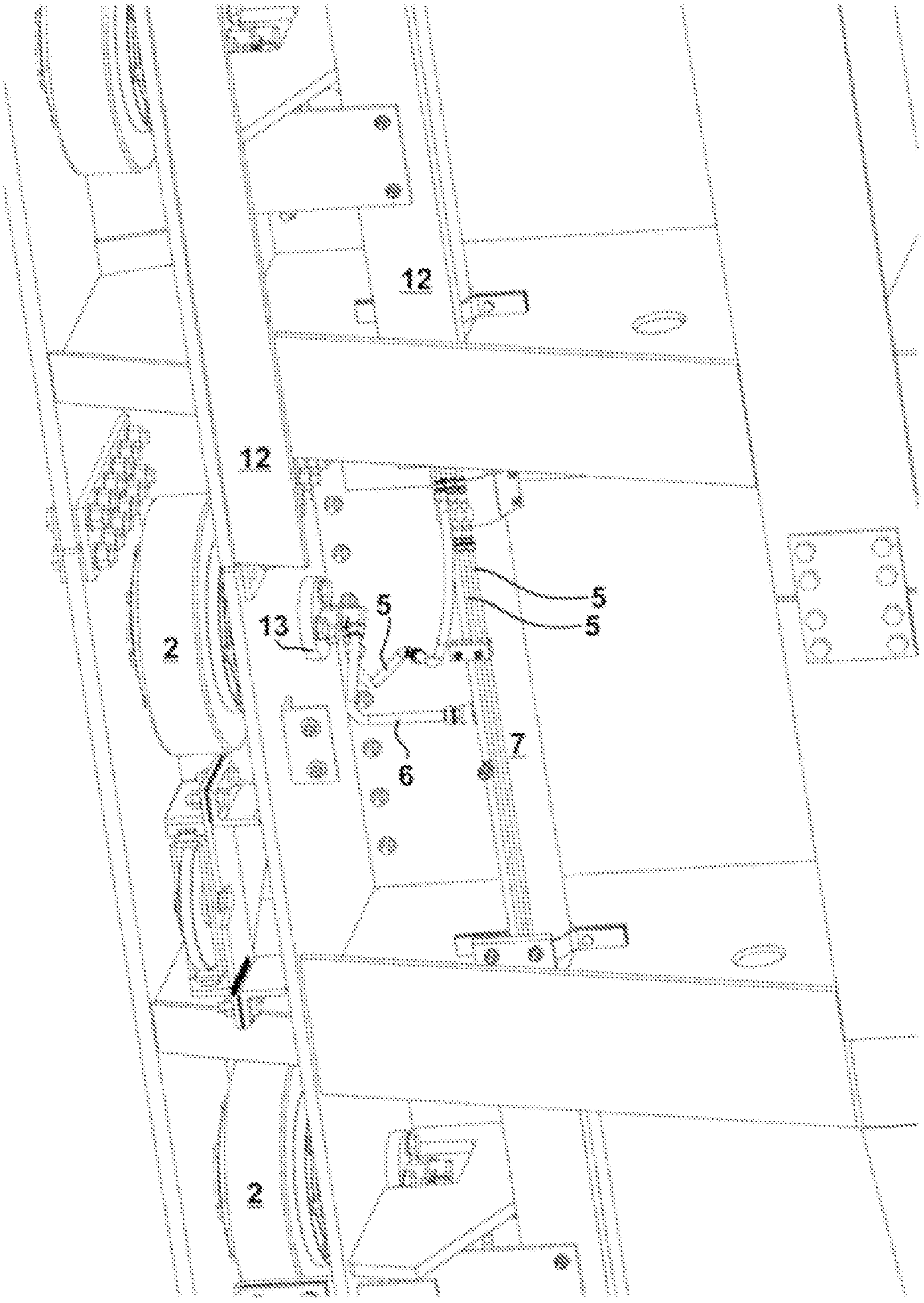
FIGS. 3 and 4 show detailed views of a sluice gate according to the invention.

FIG. 3 shows a detailed view of a sluice gate 1 according to the invention, namely a region of the rollers 2, wherein in the region of a roller 2 the protective plates 12 are not illustrated, so that the lubricant lines 5 assigned to said roller 2, the lubricant return line 6, and the lubricant return collection line 7 can be better identified. As can be seen, the roller 2 or a bearing of the roller 2 is connected to the lubricant line 5 on the one hand, which lubricant line 5 projects from a roller axle 13 to an upper end of the associated channel 9. In order to lubricate the bearings of the rollers 2, the lubricant or grease is typically guided from the roller axle 13 to the bearing through radial bores. On the other hand, a lubricant return line 6 is provided which is likewise connected to the roller axle 13 at an end and, in terms of the diameter, is roughly equal to the lubricant line 5. At the other end, the lubricant return line 6 opens into a lubricant return collection line 7 which, in terms of the diameter, is embodied to be significantly larger than the lubricant line 5 and the lubricant return line 6. The lubricant return collection line 7 is roughly vertically oriented, so that used lubricant from the individual bearings is collected in said lubricant return collection line 7 and, for example, can be removed from the lubricant return collection line 7 using a mobile pump. The lubricant return collection line 7 closed at a lower end, in which lubricant return collection line 7 used lubricant from the rollers 2 of a row 8 is collected, runs essentially parallel to the eight lubricant lines 5 through which the bearings of the eight rollers 2 of said row 8 of the sluice gate are supplied with lubricant.

As can be seen, the lubricant return line 6 connects locations of the roller axle 13 and the lubricant return collection line 7 that are essentially located in the same horizontal position, or there is possibly a slight slope from the roller axle 13 to the lubricant return collection line 7, so that a short line length of the lubricant return line 6, and therefore a low resistance in said lubricant return line 6, to the lubricant return collection line 7 results. This ensures a reliable removal of used lubricant.

In order to convey used lubricant from the bearings, which lubricant can clump up, into the lubricant return collection line 7 in a particularly reliable manner, it can be provided that chemicals are fed to the bearings, for example via the lubricant lines 5, which chemicals cause the clumped lubricant to be liquefied and to flow into the lubricant return collection line 7 due to gravity. It shall be understood that the most diverse chemicals can be used depending on the lubricant used.

Figure 4:
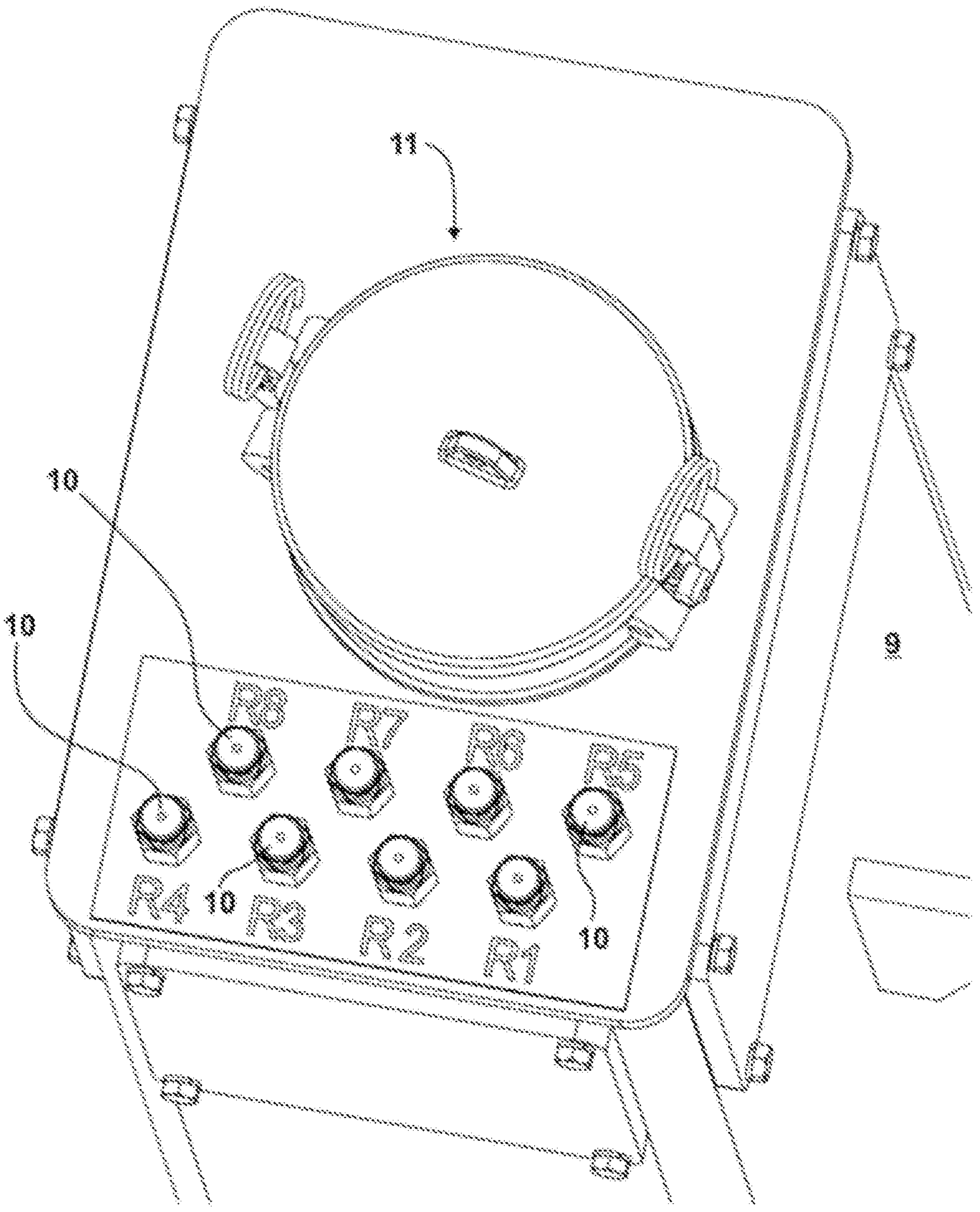

FIG. 4 shows a fitting arranged at a head end of the channels 9. As can be seen, the fitting comprises nine closable openings, wherein eight openings are embodied as lubricant feed openings 10 which are connected to the eight lubricant lines 5 for the bearings of the eight rollers 2 of a row 8. Furthermore, the fitting comprises an opening embodied as a removal opening 11 for the lubricant return collection line 7 that likewise opens into the fitting, which opening is closed by a detachable cover in this case and through which additional removal opening 11 lubricant collected in the lubricant return collection line 7 can be removed by means of a mobile pump. A maintenance and a removal of used lubricant are thus easily possible from an upper end of the sluice gate 1.

The sluice gate 1 according to the invention can, for example, be used on a dam and enables a particularly environmentally friendly operation, especially since used lubricant does not flow into a body of water, as is common with sluice gates 1 from the prior art, but rather can be collected via the lubricant return lines 6 and then properly disposed of.

The invention claimed is:

1. A sluice gate for a hydropower station, the sluice gate comprising:

- rollers configured to move the sluice gate by moving along rails;
- a sealing surface having a seal with which an upstream water can be sealed off from a downstream water;
- lubricant lines configured to feed lubricant to the rollers; and
- lubricant return lines connected to the rollers and configured to guide used lubricant through the lubricant return lines from the rollers to one or more collection locations in order to be able to collect and properly dispose of the used lubricant,
- wherein the rollers are arranged in multiple rows,
- the lubricant return lines for the multiple rows are connected to a shared lubricant return collection line,
- the shared lubricant return collection line has a diameter that is equal to at least five times a diameter of each of the lubricant return lines,
- multiple lubricant lines, of the lubricant lines, are arranged, at least in regions, in a channel together with at least the shared lubricant return collection line, and
- the channel includes closable openings, at an upper end, through which fresh lubricant can be fed and the used lubricant can be removed.

2. The sluice gate according to claim 1, wherein the shared lubricant return collection line is vertically oriented.

3. The sluice gate according to claim 1, wherein the lubricant return lines connect locations on the rollers to locations on the shared lubricant return collection line that are arranged in a same horizontal position.

4. The sluice gate according to claim 1, wherein the channel vertically protrudes past the sealing surface at an upper end of the sealing surface.

5. The sluice gate according to claim 1, further comprising one or more protective plates, wherein

- the one or more protective plates are provided in parallel to the sealing surface, and
- the lubricant lines, the lubricant return lines, and/or the shared lubricant return collection line are arranged, at least in regions, between the one or more protective plates and the sealing surface.

6. A hydropower station, comprising:

- a sluice gate according to claim 1.

7. The hydropower station according to claim 6, wherein the hydropower station is a dam.

8. A method for operating a sluice gate of a hydropower station, comprising:

- moving the sluice gate according to claim 1 by using rollers mounted on rails in order to seal off upstream water from downstream water or to produce a connection between the upstream water and downstream water;
- feeding lubricant to the rollers through lubricant lines; and
- removing used lubricant from the rollers to one or more collection locations through lubricant return lines.

9. The method according to claim 8, wherein the one or more collection locations is a shared lubricant return collection line, and wherein the used lubricant is pumped away from the shared lubricant return collection line connected to multiple lubricant return lines, using a pump.

10. The method according to claim 9, wherein the pump is a mobile pump.

11. The method according to claim 8, wherein the used lubricant is liquefied before being conveyed to the one or more collection locations.

12. The method according to claim 11, wherein the used lubricant is liquefied before being conveyed to the one or more collection locations by adding chemicals.

13. The sluice gate according to claim 1, wherein the lubricant return lines, for the rollers of one of the multiple rows, are each connected to the shared lubricant return collection line.

* * * * *